United States Patent
Kondo et al.

(10) Patent No.: US 11,783,852 B2
(45) Date of Patent: Oct. 10, 2023

(54) INFORMATION PROCESSING DEVICE, INFORMATION PROCESSING METHOD, AND INFORMATION PROCESSING PROGRAM

(71) Applicant: FUJIFILM CORPORATION, Tokyo (JP)

(72) Inventors: Michitaka Kondo, Tokyo (JP); Yutaka Oishi, Tokyo (JP); Takashi Miyamoto, Tokyo (JP); Terue Watanabe, Tokyo (JP); Koji Matsumura, Tokyo (JP); Yuko Uno, Tokyo (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 17/822,133

(22) Filed: Aug. 25, 2022

(65) Prior Publication Data

US 2022/0415343 A1    Dec. 29, 2022

Related U.S. Application Data

(63) Continuation of application No. PCT/JP2020/038131, filed on Oct. 8, 2020.

(30) Foreign Application Priority Data

Mar. 13, 2020  (JP) .................................. 2020-044485

(51) Int. Cl.
*G11B 5/008* (2006.01)

(52) U.S. Cl.
CPC .................. *G11B 5/00813* (2013.01)

(58) Field of Classification Search
None
See application file for complete search history.

(56) References Cited

U.S. PATENT DOCUMENTS

| | | | |
|---|---|---|---|
| 4,929,946 A * | 5/1990 | O'Brien | G11B 20/1833 341/95 |
| 5,293,388 A * | 3/1994 | Monroe | G11B 20/1833 714/752 |

(Continued)

FOREIGN PATENT DOCUMENTS

| | | |
|---|---|---|
| EP | 0913825 A2 | 5/1999 |
| JP | 2003-099308 A | 4/2003 |

(Continued)

OTHER PUBLICATIONS

International Search Report issued in International Application No. PCT/JP2020/038131 dated Dec. 15, 2020.

(Continued)

*Primary Examiner* — Peter Vincent Agustin
(74) *Attorney, Agent, or Firm* — SOLARIS Intellectual Property Group, PLLC (57) ABSTRACT

An information processing device selects, in a case where a plurality of pieces of data are collected and transmitted to a tape drive to be recorded on a magnetic tape, one mode of a first mode of transmitting a data group obtained by collecting the plurality of pieces of data without compression, to the tape drive, a second mode of transmitting a compressed data group in which the data group obtained by collecting the plurality of pieces of data is compressed, to the tape drive, or a third mode of transmitting a data group obtained by collecting a part of the plurality of pieces of data and remaining data, in which the part of the plurality of pieces of data is compressed and the remaining data is not compressed, to the tape drive, and transmits a data group generated in accordance with the selected mode, to the tape drive.

20 Claims, 7 Drawing Sheets

(56) References Cited

U.S. PATENT DOCUMENTS

| | | | |
|---|---|---|---|
| 6,654,189 B1* | 11/2003 | Sasaki | G11B 20/00007 360/32 |
| 2008/0215171 A1* | 9/2008 | Sutardja | G11B 27/11 700/94 |
| 2012/0166752 A1* | 6/2012 | Taniyama | G06F 3/0664 711/170 |
| 2014/0013068 A1 | 1/2014 | Yamato et al. | |
| 2017/0139946 A1* | 5/2017 | Kawamura | G06F 16/1744 |
| 2017/0147253 A1* | 5/2017 | Kawamura | G06F 3/0638 |
| 2017/0168741 A1* | 6/2017 | Carter | G06F 11/00 |
| 2022/0415343 A1* | 12/2022 | Kondo | G06F 3/0682 |

FOREIGN PATENT DOCUMENTS

| | | |
|---|---|---|
| JP | 2005-293224 A | 10/2005 |
| JP | 2007-213115 A | 8/2007 |
| JP | 2012-133731 A | 7/2012 |

OTHER PUBLICATIONS

Written Opinion of the ISA issued in International Application No. PCT/JP2020/038131 dated Dec. 15, 2020.
Extended European Search Report dated Jul. 12, 2023, issued in corresponding EP Patent Application No. 20924361.7.

* cited by examiner

| FILE NAME | COMPRESSION RATIO [%] | TIME REQUIRED FOR COMPRESSION [SECONDS] |
|---|---|---|
| a.txt | 90 | 0.5 |
| b.pdf | 10 | 1.0 |
| ... | ... | ... |

| EXTENTION | COMPRESSION RATIO [%] | TIME REQUIRED FOR COMPRESSION [SECONDS] |
|---|---|---|
| EXTENTION A | 91.3 | 0.39 |
| EXTENTION B | 9.3 | 1.22 |
| ... | ... | ... |

| COMPRESSION RATIO | SCORE A |
|---|---|
| 80% OR MORE | 5 |
| 60% OR MORE AND LESS THAN 80% | 4 |
| 40% OR MORE AND LESS THAN 60% | 3 |
| 20% OR MORE AND LESS THAN 40% | 2 |
| LESS THAN 20% | 1 |

| TIME REQUIRED FOR COMPRESSION | SCORE B |
|---|---|
| LESS THAN 0.4 SECONDS | 5 |
| 0.4 SECONDS OR MORE AND LESS THAN 0.6 SECONDS | 4 |
| 0.6 SECONDS OR MORE AND LESS THAN 0.8 SECONDS | 3 |
| 0.8 SECONDS OR MORE AND LESS THAN 1.0 SECONDS | 2 |
| 1 SECOND OR MORE | 1 |

INFORMATION PROCESSING DEVICE, INFORMATION PROCESSING METHOD, AND INFORMATION PROCESSING PROGRAM

CROSS-REFERENCE TO RELATED APPLICATION

This application is a continuation application of International Application No. PCT/JP2020/038131 filed Oct. 8, 2020, the disclosure of which is incorporated herein by reference in its entirety. Further, this application claims priority from Japanese Patent Application No. 2020-044485 filed on Mar. 13, 2020, the disclosures of which is incorporated herein by reference in its entirety.

BACKGROUND

1. Technical Field

The present disclosure relates to an information processing device, an information processing method, and an information processing program.

2. Description of the Related Art

A technique for determining whether to compress data in a block unit or not to compress data and storing the data in a storage according to a determination result is disclosed (see JP2012-133731A).

SUMMARY

Meanwhile, in a case where data is recorded on a magnetic tape, a data group obtained by collecting a plurality of pieces of data is transmitted from an information processing device that controls a tape drive in which the magnetic tape is stored, to the tape drive. In the tape drive, the data group transmitted from the information processing device is recorded on the magnetic tape.

Further, in order to enhance the recording efficiency of data on the magnetic tape, it is preferable to compress data. However, compression of data may not be efficient depending on various conditions, such as the transfer rate of data from the information processing device to the tape drive, the format of data, and the resource status of the information processing device.

In the technique disclosed in JP2012-133731A, in a case where the data group obtained by collecting the plurality of pieces of data is recorded on the magnetic tape, how to efficiently record the data group is not considered.

The present disclosure has been made in view of the above circumstances, and an object thereof is to provide an information processing device, an information processing method, and an information processing program capable of efficiently recording a data group obtained by collecting a plurality of pieces of data, on a magnetic tape.

According to the present disclosure, there is provided an information processing device comprising: at least one processor, in which the processor selects, in a case where a plurality of pieces of data are collected and transmitted to a tape drive to be recorded on a magnetic tape, one mode of a first mode of transmitting a data group obtained by collecting the plurality of pieces of data without compression, to the tape drive, a second mode of transmitting a compressed data group in which the data group obtained by collecting the plurality of pieces of data is compressed, to the tape drive, or a third mode of transmitting a data group obtained by collecting a part of the plurality of pieces of data and remaining data, in which the part of the plurality of pieces of data is compressed and the remaining data is not compressed, to the tape drive, and transmits a data group generated in accordance with the selected mode, to the tape drive.

In the information processing device of the present disclosure, the processor may select the one mode according to each of the plurality of pieces of data.

Further, in the information processing device of the present disclosure, the processor may select the one mode by using at least one of a compression ratio of the data, a time required for compression, or a time required for transmission of the data group to the tape drive.

Alternatively, in the information processing device of the present disclosure, the processor may select the one mode according to the magnetic tape of a recording destination of the data group.

Alternatively, in the information processing device of the present disclosure, the processor may select the one mode according to a time slot in which processing of collecting the plurality of pieces of data into the data group is performed.

Alternatively, in the information processing device of the present disclosure, the processor may select the one mode according to a resource status of the information processing device.

Alternatively, in the information processing device of the present disclosure, the processor may select the one mode according to a maximum transmission rate of data to the tape drive and a reception rate of the plurality of pieces of data, which are determined according to a standard of a connection interface between the information processing device and the tape drive.

Alternatively, in the information processing device of the present disclosure, the processor may evaluate at least one of the first mode, the second mode, or the third mode to select the one mode according to an evaluation result.

Further, in the information processing device of the present disclosure, the processor may change the number of evaluation targets according to a resource status of the information processing device.

Alternatively, in the information processing device of the present disclosure, the processor may select the one mode according to the number of parallel processing in a case where processing of collecting the plurality of pieces of data into the data group is performed in parallel.

Further, in the information processing device of the present disclosure, the processor may select a compression algorithm used for data compression according to the magnetic tape of a recording destination of the data group, a time slot in which processing of collecting the plurality of pieces of data into the data group is performed, or a resource status of the information processing device, in a case where the second mode or the third mode is selected.

Further, according to the present disclosure, there is provided an information processing method executed by a processor provided in an information processing device, the method comprising: selecting, in a case where a plurality of pieces of data are collected and transmitted to a tape drive to be recorded on a magnetic tape, one mode of a first mode of transmitting a data group obtained by collecting the plurality of pieces of data without compression, to the tape drive, a second mode of transmitting a compressed data group in which the data group obtained by collecting the plurality of pieces of data is compressed, to the tape drive, or a third mode of transmitting a data group obtained by collecting a part of the plurality of pieces of data and remaining data, in which the part of the plurality of pieces of data is compressed and the remaining data is not compressed, to the tape drive; and transmitting a data group generated in accordance with the selected mode, to the tape drive.

Further, according to the present disclosure, there is provided an information processing program for causing a processor provided in an information processing device to execute a process comprising: selecting, in a case where a plurality of pieces of data are collected and transmitted to a tape drive to be recorded on a magnetic tape, one mode of a first mode of transmitting a data group obtained by collecting the plurality of pieces of data without compression, to the tape drive, a second mode of transmitting a compressed data group in which the data group obtained by collecting the plurality of pieces of data is compressed, to the tape drive, or a third mode of transmitting a data group obtained by collecting a part of the plurality of pieces of data and remaining data, in which the part of the plurality of pieces of data is compressed and the remaining data is not compressed, to the tape drive; and transmitting a data group generated in accordance with the selected mode, to the tape drive.

According to the present disclosure, a data group obtained by collecting a plurality of pieces of data can be efficiently recorded on a magnetic tape.

DETAILED DESCRIPTION

Hereinafter, examples of embodiments of the technique of the present disclosure will be described in detail with reference to the drawings.

Figure 1:
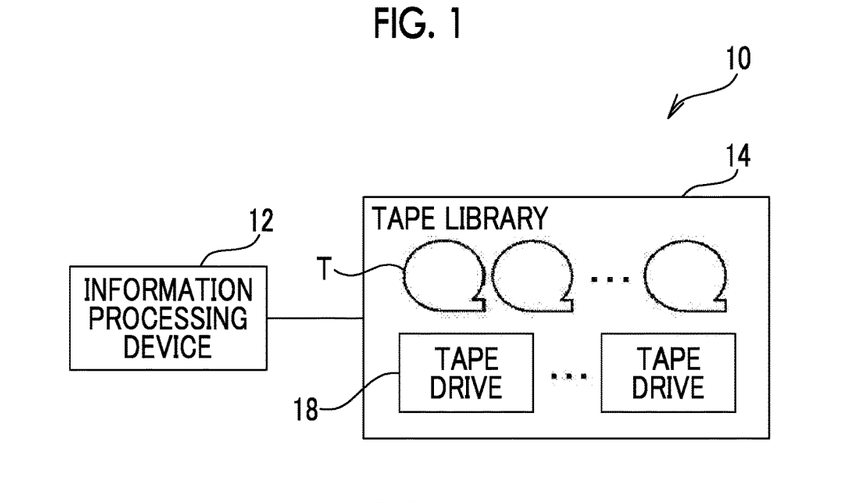
FIG. 1 is a block diagram showing an example of a configuration of a recording and reproducing system.

First, a configuration of a recording and reproducing system 10 according to the present embodiment will be described with reference to FIG. 1. As shown in FIG. 1, the recording and reproducing system 10 includes an information processing device 12 and a tape library 14.

The tape library 14 comprises a plurality of slots (not shown) and a plurality of tape drives 18, and a magnetic tape T as an example of a recording medium is stored in each slot. Each tape drive 18 is connected to the information processing device 12. An example of the magnetic tape T includes a linear tape-open (LTO) tape.

In a case where the information processing device 12 writes or reads data with respect to the magnetic tape T, the magnetic tape T to be written or to be read is loaded from the slot into the predetermined tape drive 18. In a case where the writing or reading of data with respect to the magnetic tape T loaded in the tape drive 18 is completed, the magnetic tape T is unloaded from the tape drive 18 to the originally stored slot.

Figure 2:
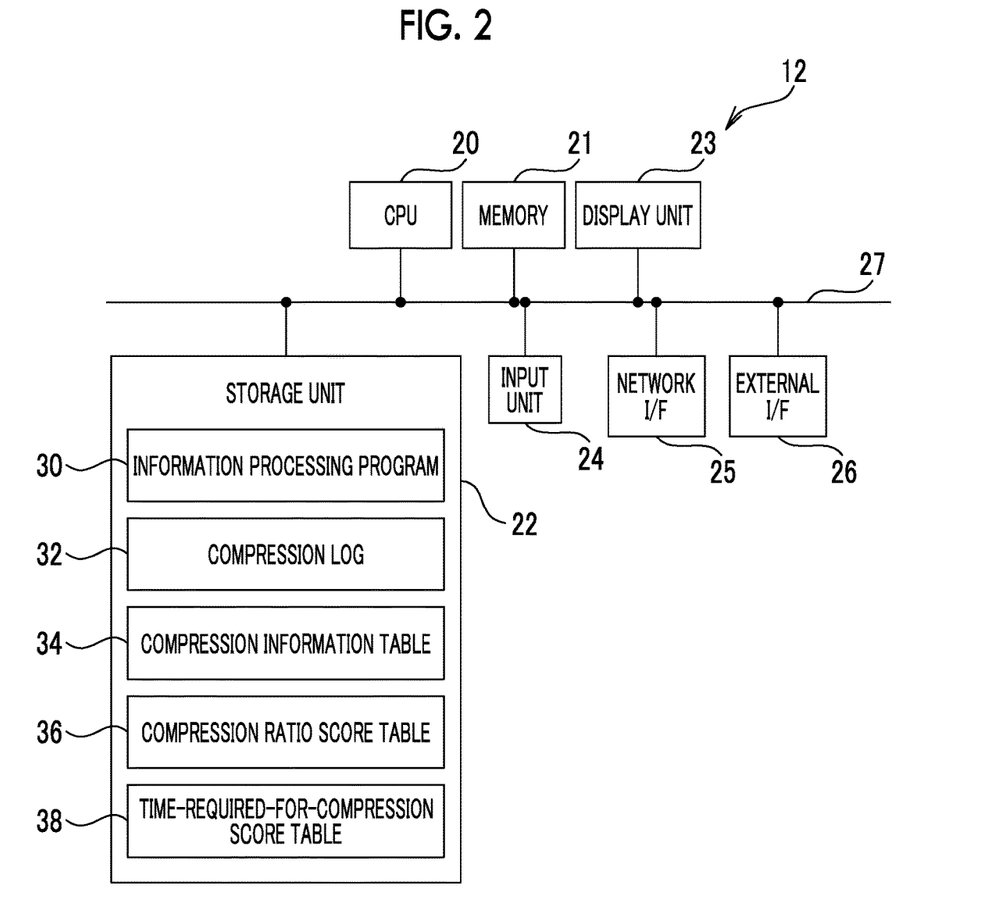
FIG. 2 is a block diagram showing an example of a hardware configuration of an information processing device.

Next, a hardware configuration of the information processing device 12 according to the present embodiment will be described with reference to FIG. 2. As shown in FIG. 2, the information processing device 12 includes a central processing unit (CPU) 20, a memory 21 serving as a temporary storage area, and a non-volatile storage unit 22. In addition, the information processing device 12 includes a display unit 23, such as a liquid crystal display, an input unit 24, such as a keyboard and a mouse, a network interface (I/F) 25 connected to a network, and an external I/F 26 to which each tape drive 18 is connected. The CPU 20, the memory 21, the storage unit 22, the display unit 23, the input unit 24, the network I/F 25, and the external I/F 26 are connected to a bus 27.

The storage unit 22 is realized by a hard disk drive (HDD), a solid state drive (SSD), a flash memory, or the like. An information processing program 30 is stored in the storage unit 22 serving as a storage medium. The CPU 20 reads out the information processing program 30 from the storage unit 22 and then develops the information processing program 30 into the memory 21, and executes the developed information processing program 30. An example of the information processing device 12 includes a server computer.

Further, the storage unit 22 stores a compression log 32, a compression information table 34, a compression ratio score table 36, and a time-required-for-compression score table 38.

Figure 3:
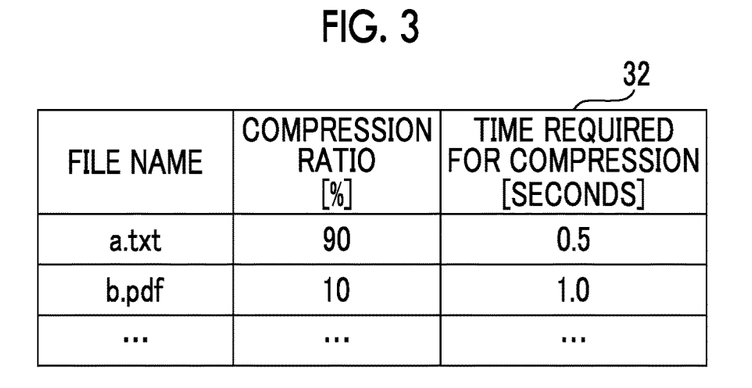
FIG. 3 is a diagram showing an example of a compression log.

FIG. 3 shows an example of the compression log 32. In the compression log 32, log data indicating the history of data compression processing performed by the information processing device 12 is recorded. As shown in FIG. 3, in the compression log 32, a file name as an example of data identification information, a compression ratio when data is compressed, and a time required for compression when data is compressed are recorded for each data. The compression ratio referred to herein is represented by Equation (1), and indicates that the larger the number is, the more compressed data is.

$$\text{Compression ratio} = ((\text{data size before compression} - \text{data size after compression})/\text{data size before compression}) \times 100 \quad (1)$$

For example, in a case where the data size before compression is 50 MB and the data size after compression is 10 MB, the compression ratio is 80% (=((50−10)/50)×100). Further, the time required for compression referred to herein means the time required for the compression processing per unit data size (for example, 1 MB).

Figure 4:
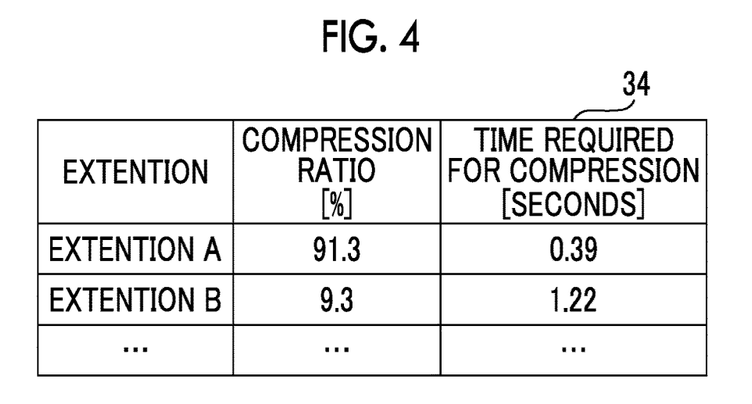
FIG. 4 is a diagram showing an example of a compression information table.

FIG. 4 shows an example of the compression information table 34. In the compression information table 34, information regarding the compression ratio of data and the time required for compression obtained by using the compression log 32 is recorded. As shown in FIG. 4, in the compression information table 34, the compression ratio and the time required for compression are recorded for each extension of data. The compression ratio and the time required for compression are respective average values of the compression ratios and the times required for compression for each extension of data obtained by using the compression log 32.

Figure 5:
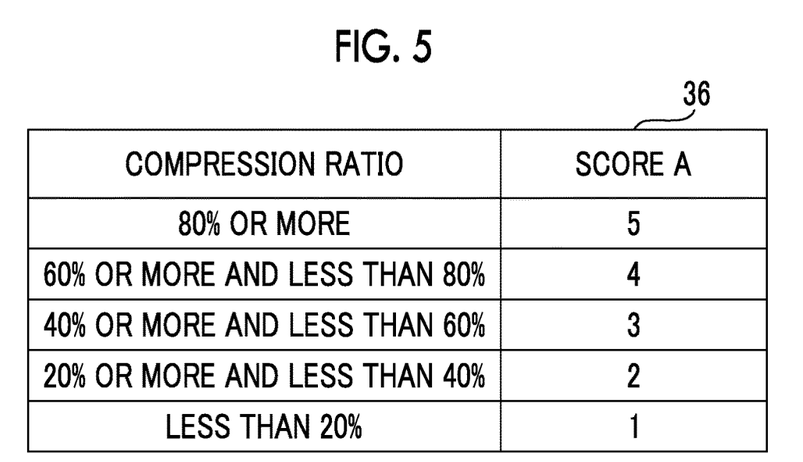
FIG. 5 is a diagram showing an example of a compression ratio score table.

FIG. 5 shows an example of the compression ratio score table 36. The compression ratio score table 36 is a table for obtaining a score corresponding to the compression ratio (hereinafter, referred to as "score A"). As shown in FIG. 5, in the compression ratio score table 36, a plurality of compression ratio ranges different from each other and the scores A in a case where the compression ratios are within the respective ranges are stored in association with each other. The score A according to the present embodiment is set to a larger value as the compression ratio is higher. In the example of FIG. 5, the score corresponding to the compression ratio is shown in five stages as an example, but four stages or less or six stages or more may be used. Further, the boundary value between the compression ratio ranges is not limited to the example shown in FIG. 5, and may be another boundary value.

Figure 6:
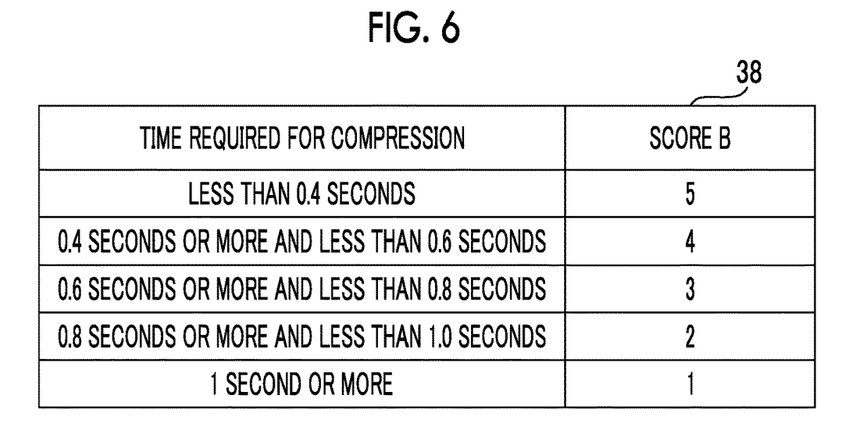
FIG. 6 is a diagram showing an example of a time-required-for-compression score table.

FIG. 6 shows an example of the time-required-for-compression score table 38. The time-required-for-compression score table 38 is a table for obtaining a score corresponding to the time required for compression (hereinafter, referred to as "score B"). As shown in FIG. 6, in the time-required-for-compression score table 38, a plurality of time-required-for-compression ranges different from each other and the scores B in a case where the times required for compression are within the respective ranges are stored in association with each other. The score B according to the present embodiment is set to a larger value as the time required for compression is shorter. In the example of FIG. 6, the score corresponding to the time required for compression is shown in five stages as an example, but four stages or less or six stages or more may be used. Further, the boundary value between the time-required-for-compression ranges is not limited to the example shown in FIG. 6, and may be another boundary value.

Figure 7:
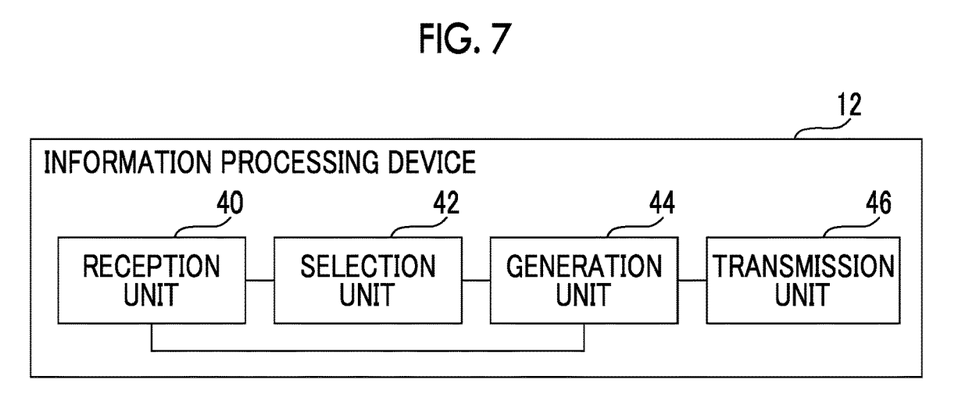
FIG. 7 is a block diagram showing an example of a functional configuration of the information processing device.

Next, a functional configuration of the information processing device 12 according to the present embodiment will be described with reference to FIG. 7. As shown in FIG. 7, the information processing device 12 includes a reception unit 40, a selection unit 42, a generation unit 44, and a transmission unit 46. The CPU 20 executes the information processing program 30 to function as the reception unit 40, the selection unit 42, the generation unit 44, and the transmission unit 46.

The reception unit 40 receives a plurality of pieces of data transmitted from a user terminal via the network I/F 25. The plurality of pieces of data are data to be recorded on the magnetic tape T.

The selection unit 42 selects one mode of the following first mode, second mode, or third mode, in collecting the plurality of pieces of data received by the reception unit 40 and transmitting the collected data to the tape drive 18 to record the transmitted data on the magnetic tape T.

Figure 8:
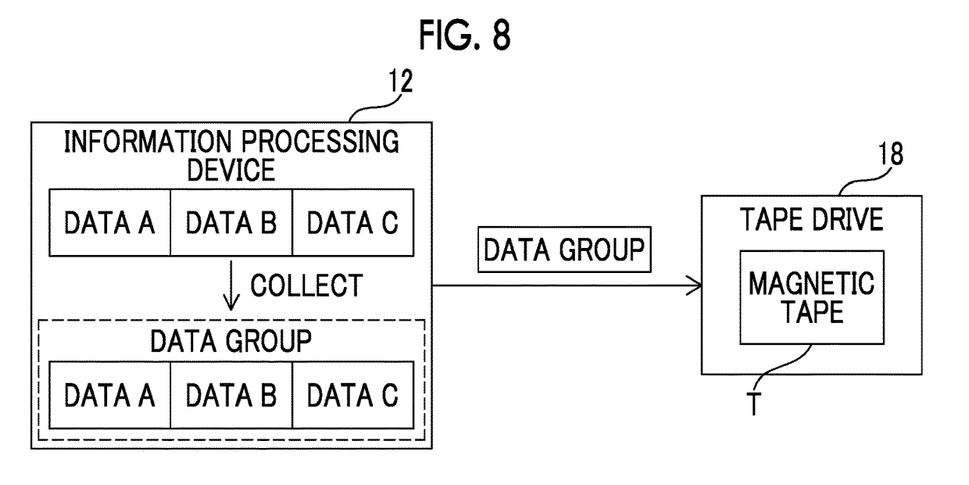
FIG. 8 is a diagram illustrating a first mode.

As shown in FIG. 8, the first mode is a mode of transmitting a data group obtained by collecting a plurality of pieces of data into one file without compression, to the tape drive 18.

Figure 9:
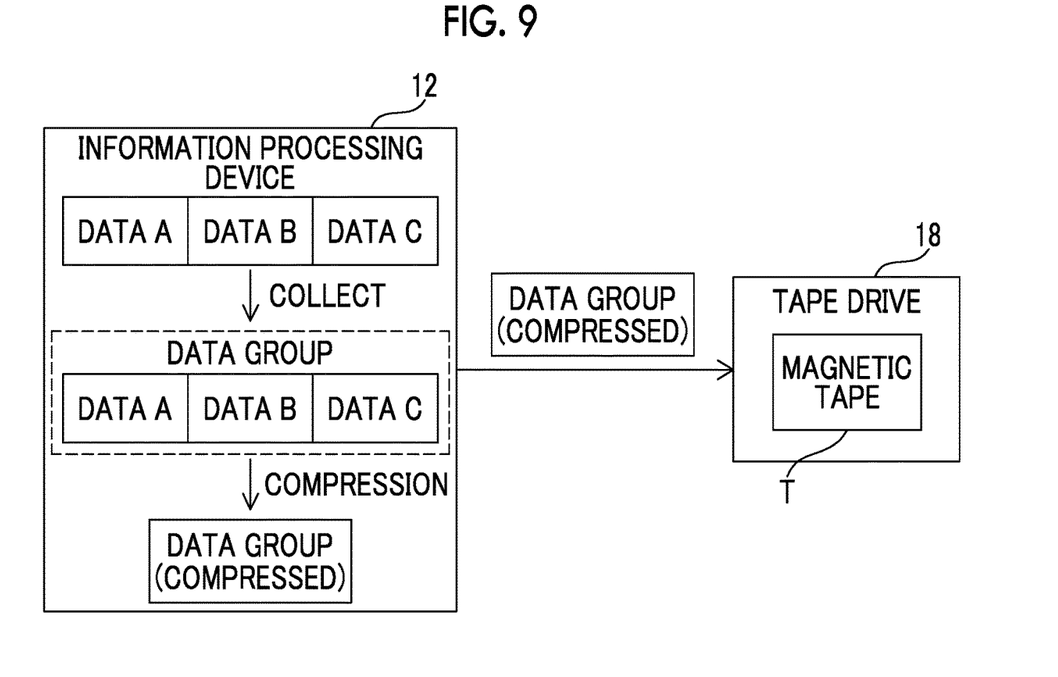
FIG. 9 is a diagram illustrating a second mode.

As shown in FIG. 9, the second mode is a mode of transmitting a compressed data group in which the data group obtained by collecting the plurality of pieces of data into one file is compressed, to the tape drive 18.

Figure 10:
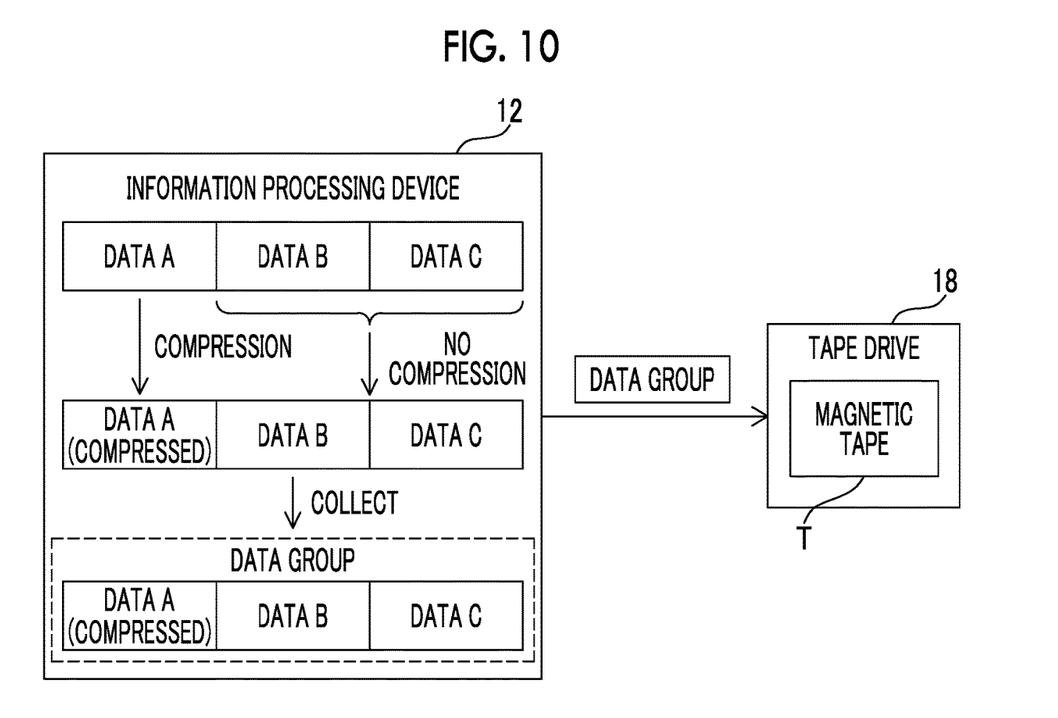
FIG. 10 is a diagram illustrating a third mode.

As shown in FIG. 10, the third mode is a mode of transmitting a data group obtained by collecting a part of the plurality of pieces of data and the remaining data into one file in which the part of the plurality of pieces of data is compressed and the remaining data is not compressed, to the tape drive 18.

The first mode is considered to be suitable for a case where most of the data, out of the plurality of pieces of data, is already compressed data, such as moving image data of a Moving Picture Experts Group (MPEG) format. The second mode is considered to be suitable for a case where most of the data, out of the plurality of pieces of data, is data having a relatively high compression ratio, such as text format data. The third mode is considered to be suitable for a case where the difference in size between compressed data and data having a relatively high compression ratio, out of the plurality of pieces of data, is not so large.

In that respect, the selection unit 42 selects one mode of the first mode, the second mode, or the third mode according to each of the plurality of pieces of data received by the reception unit 40. The selection unit 42 uses the compression ratio of data and the time required for compression for this selection. Hereinafter, the selection processing performed by the selection unit 42 will be described in detail.

The selection unit 42 refers to the compression information table 34 to acquire the compression ratio and the time required for compression corresponding to the extension of data, for each of the plurality of pieces of data received by the reception unit 40. Further, the selection unit 42 refers to the compression ratio score table 36 to acquire the score A corresponding to the acquired compression ratio, for each of the plurality of pieces of data. Further, the selection unit 42 refers to the time-required-for-compression score table 38 to acquire the score B corresponding to the acquired time required for compression, for each of the plurality of pieces of data.

Then, the selection unit 42 selects one mode of the first mode, the second mode, or the third mode by comparing a total value T1 of the score A and the score B with predetermined threshold values TH1 and TH2 (TH1>TH2). Specifically, the selection unit 42 selects the second mode in a case where an average value A1 of the respective total values T1 of the plurality of pieces of data is the threshold value TH1 or greater.

Alternatively, the selection unit 42 selects the third mode in a case where the average value A1 is the threshold value TH2 or greater and is less than the threshold value TH1. Further, in a case where the selection unit 42 selects the third mode, the selection unit 42 selects data of which the total value T1 is the average value A1 or greater, out of the plurality of pieces of data, as data to be compressed. Alternatively, the selection unit 42 selects the first mode in a case where the average value A1 is less than the threshold value TH2.

The generation unit 44 generates a data group obtained by collecting the plurality of pieces of data received by the reception unit 40 into one file in accordance with the mode selected by the selection unit 42. Specifically, in a case where the first mode is selected by the selection unit 42, the generation unit 44 generates a data group obtained by collecting the plurality of pieces of data received by the reception unit 40 into one file without compression. Alternatively, in a case where the second mode is selected by the selection unit 42, the generation unit 44 generates a compressed data group obtained by collecting the plurality of pieces of data received by the reception unit 40 into one file and then compressing the collected one file.

Alternatively, in a case where the third mode is selected by the selection unit 42, the generation unit 44 generates a data group obtained by collecting a part of the plurality of pieces of data received by the reception unit 40 and the remaining data into one file in which the part of the plurality of pieces of data is compressed and the remaining data is not compressed. At this time, the generation unit 44 generates the data group obtained by collecting, out of the plurality of pieces of data, data of which the total value T1 is the average value A1 or greater and data of which the total value T1 is less than the average value A1 into one file in which the data of which the total value T1 is the average value A1 or greater is compressed and the data of which the total value T1 is less than the average value A1 is not compressed. At this time, the generation unit 44 may generate the data group obtained by collecting, out of the plurality of pieces of data, data of which the total value T1 is a threshold value (for example, 7.0) or greater and data of which the total value T1 is less than the threshold value into one file in which the data of which the total value T1 is the threshold value or greater is compressed and the data of which the total value T1 is less than the threshold value is not compressed.

The transmission unit 46 transmits the data group generated by the generation unit 44 to the tape drive 18. A control device (not shown) provided in the tape drive 18 performs control to receive the data group transmitted by the transmission unit 46 of the information processing device 12, and to record the received data group on the magnetic tape T stored in the tape drive 18.

A specific example of the selection processing performed by the selection unit 42 and the generation processing performed by the generation unit 44 will be described with reference to FIGS. 11A to 14. Here, a case where the plurality of pieces of data received by the reception unit 40 are respective five pieces of data of three types of data groups shown in FIGS. 11A to 11C will be described. The numerical values in parentheses in FIGS. 11A to 11C each indicate the total value T1 of the score A and the score B of the data. Further, here, it is assumed that the threshold value TH1 is preset to 6.6 and the threshold value TH2 is preset to 3.3.

Figure 11A:
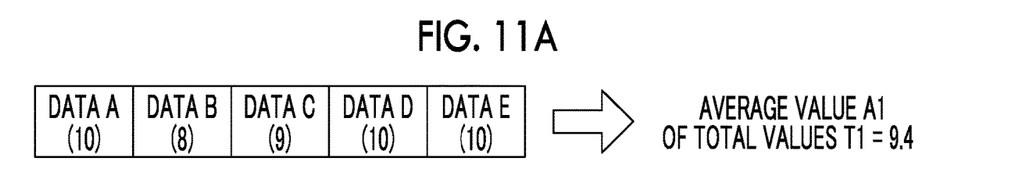
FIGS. 11A to 11C are diagrams illustrating a data group to be recorded.
Figure 11B:
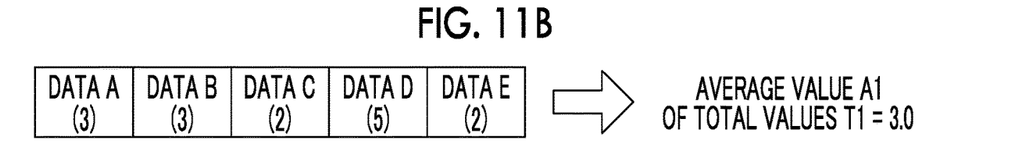
Figure 11C:
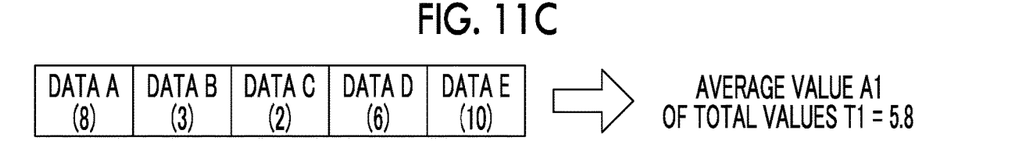

As shown in FIG. 11A, in a first data group, the average value A1 of the total values T1 is 9.4. Further, as shown in FIG. 11B, in a second data group, the average value A1 of the total values T1 is 3.0. Further, as shown in FIG. 11C, in a third data group, the average value A1 of the total values T1 is 5.8.

Figure 12:
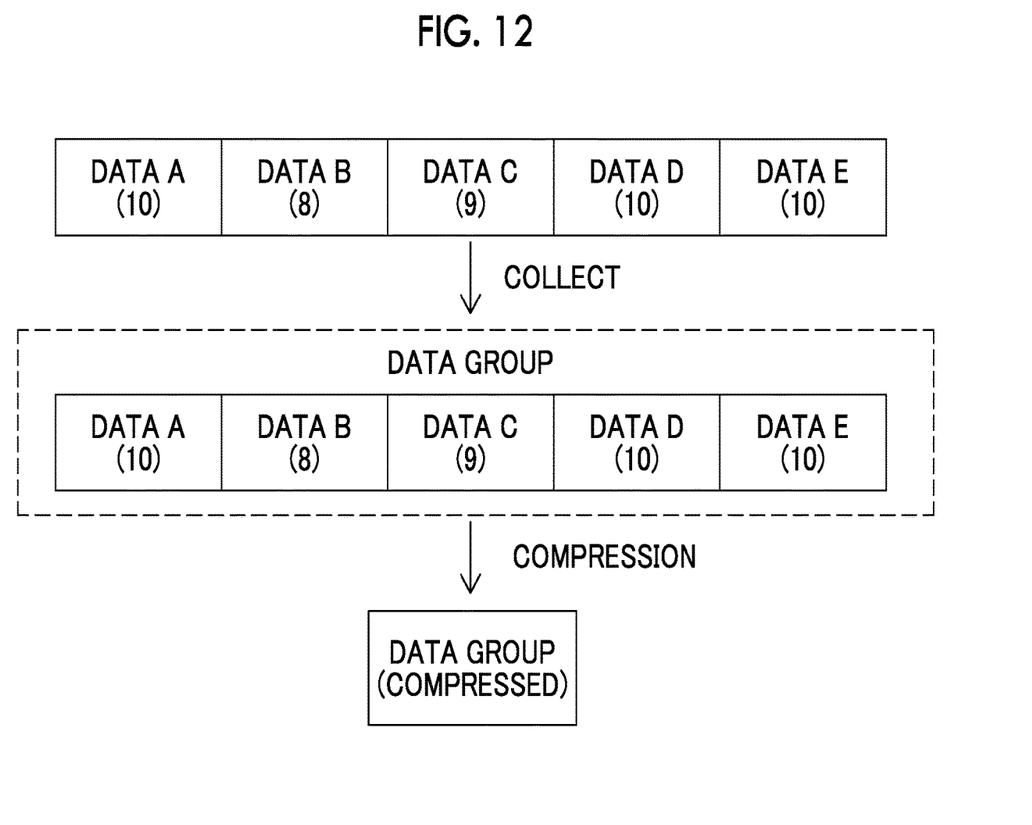
FIG. 12 is a diagram illustrating data group generation processing in a case where the second mode is selected.

Since the average value A1 of the first data group is the threshold value TH1 or greater, the selection unit 42 selects the second mode. Therefore, as shown in FIG. 12, the generation unit 44 generates a compressed data group obtained by collecting five pieces of data into one file and then compressing the collected one file.

Figure 13:
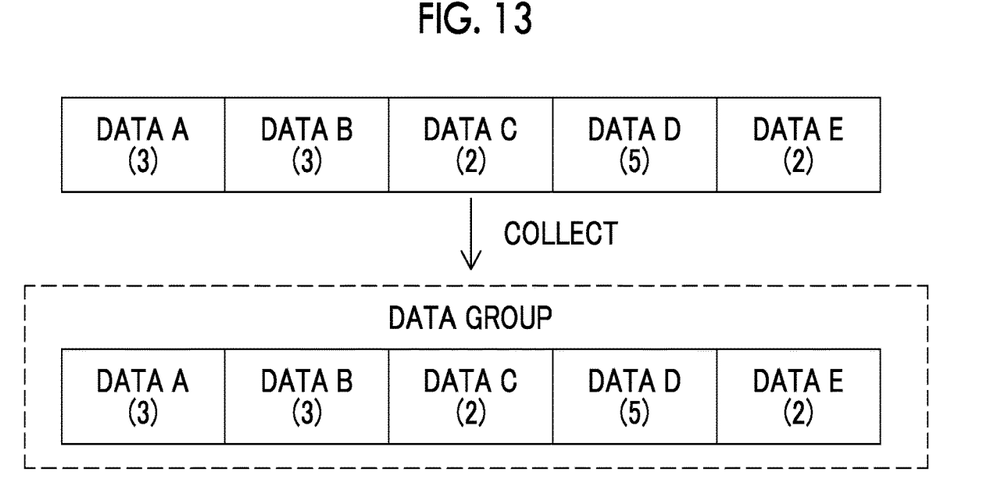
FIG. 13 is a diagram illustrating data group generation processing in a case where the first mode is selected.

Since the average value A1 of the second data group is less than the threshold value TH2, the selection unit 42 selects the first mode. Therefore, as shown in FIG. 13, the generation unit 44 generates a data group obtained by collecting the five pieces of data into one file without compression.

Figure 14:
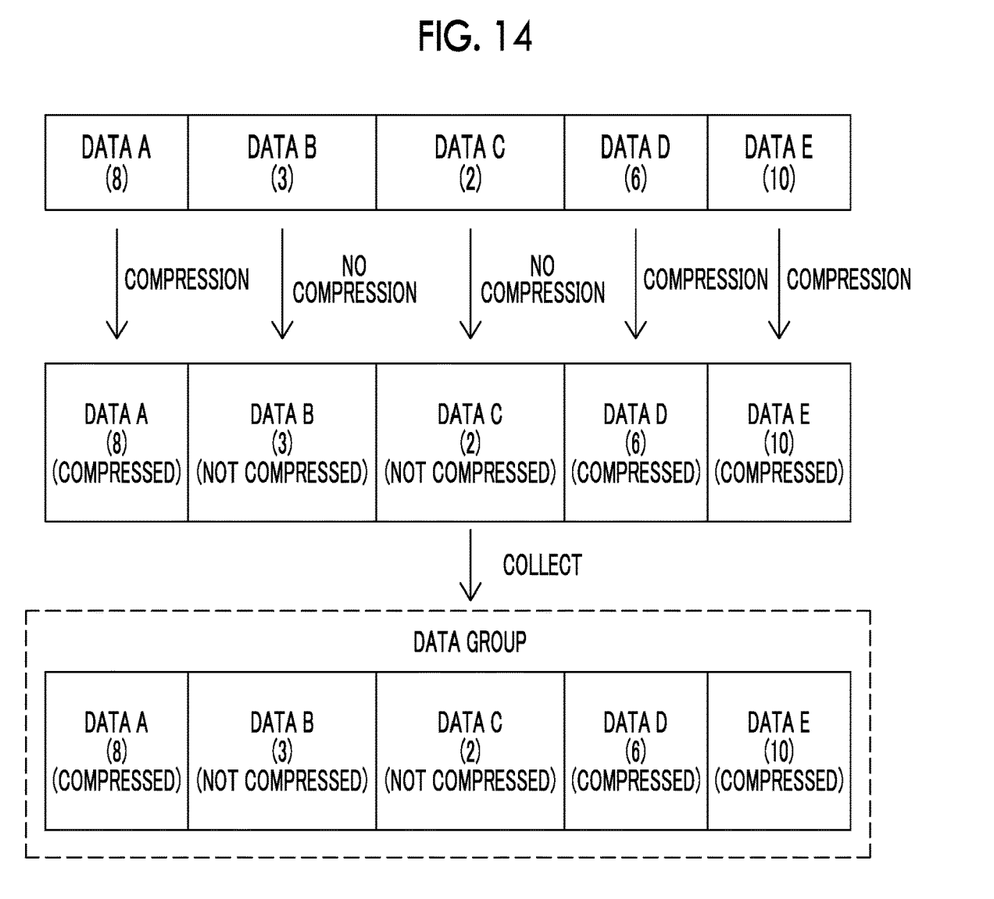
FIG. 14 is a diagram illustrating data group generation processing in a case where the third mode is selected.

In the third data group, since the average value A1 is the threshold value TH2 or greater and is less than the threshold value TH1, the selection unit 42 selects the third mode. Therefore, as shown in FIG. 14, the generation unit 44 generates a data group obtained by collecting a part of the five pieces of data and the remaining data into one file in which the part of the five pieces of data is compressed and the remaining data is not compressed. At this time, the generation unit 44 generates a data group obtained by collecting, out of the five pieces of data, data of which the total value T1 is the average value A1 or greater (in the example of FIG. 14, data A, data D, and data E) and data of which the total value T1 is less than the average value A1 (in the example of FIG. 14, data B and data C) into one file in which the data of which the total value T1 is the average value A1 or greater is compressed and the data of which the total value T1 is less than the average value A1 is not compressed.

Figure 15:
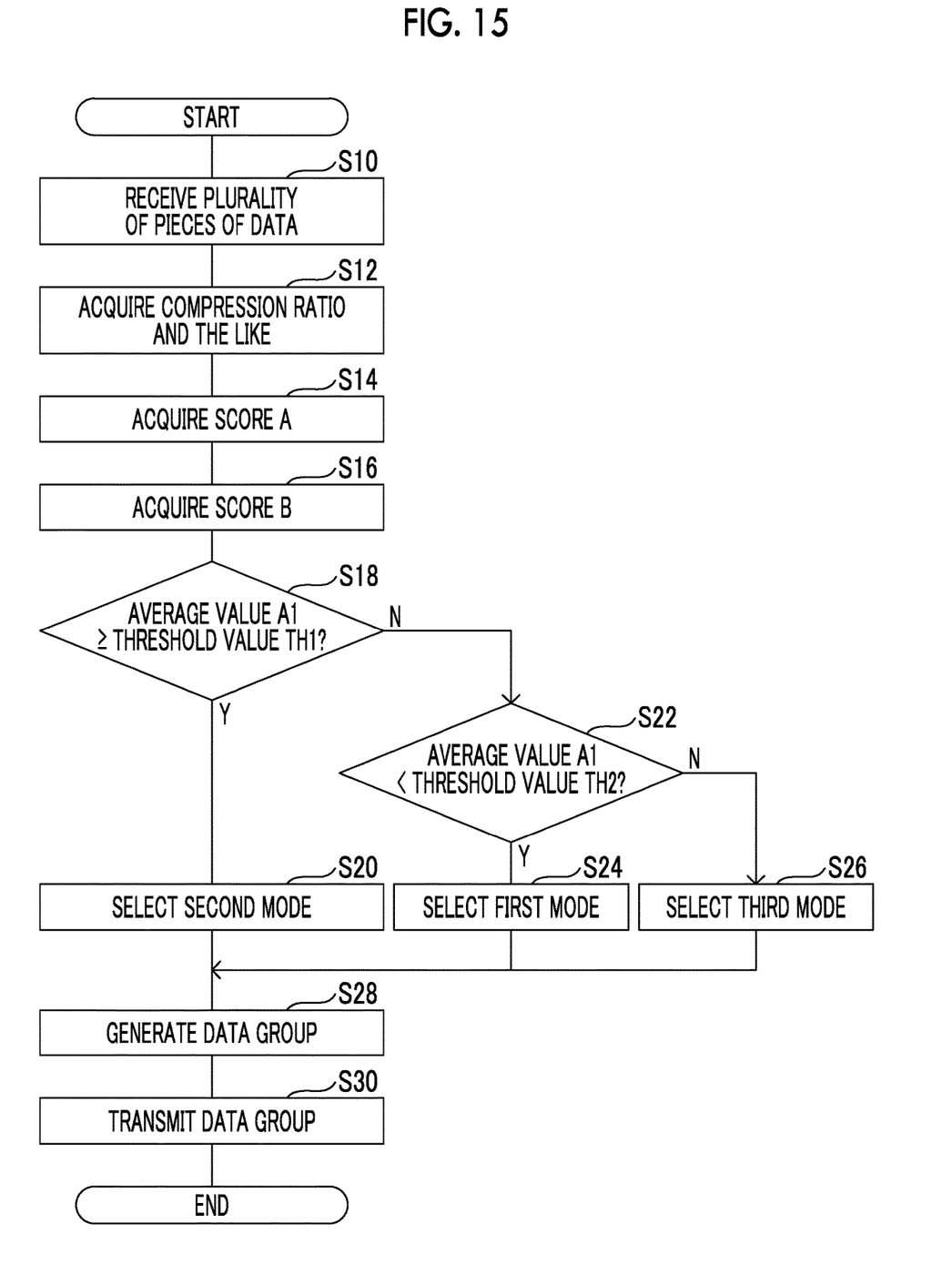
FIG. 15 is a flowchart showing an example of data recording processing.

Next, the action of the information processing device 12 according to the present embodiment will be described with reference to FIG. 15. The CPU 20 executes the information processing program 30, whereby data recording processing shown in FIG. 15 is executed. The data recording processing shown in FIG. 15 is executed, for example, in a case where a plurality of pieces of data transmitted from the user terminal are input to the information processing device 12.

In step S10 of FIG. 15, the reception unit 40 receives a plurality of pieces of data transmitted from the user terminal via the network I/F 25. In step S12, the selection unit 42 refers to the compression information table 34 to acquire the compression ratio and the time required for compression corresponding to the extension of data, for each of the plurality of pieces of data received in step S10.

In step S14, the selection unit 42 refers to the compression ratio score table 36 to acquire the score A corresponding to the compression ratio acquired in step S12, for each of the plurality of pieces of data received in step S10. In step S16, the selection unit 42 refers to the time-required-for-compression score table 38 to acquire the score B corresponding to the time required for compression acquired in step S12, for each of the plurality of pieces of data received in step S10.

In step S18, the selection unit 42 determines whether or not the average value A1 of the respective total values T1 of the scores A and the scores B acquired for the plurality of pieces of data received in step S10 is the threshold value TH1 or greater. In a case where an affirmative determination is made in this determination, the process proceeds to step S20. In step S20, the selection unit 42 selects the second mode. In a case where step S20 ends, the process proceeds to step S28.

On the other hand, in a case where a negative determination is made in the determination of step S18, the process proceeds to step S22. In step S22, the selection unit 42 determines whether or not the average value A1 is less than the threshold value TH2. In a case where an affirmative determination is made in this determination, the process proceeds to step S24. In step S24, the selection unit 42 selects the first mode. In a case where step S24 ends, the process proceeds to step S28.

Alternatively, a negative determination is made in the determination of step S22, that is, in a case where the average value A1 is the threshold value TH2 or greater and is less than the threshold value TH1, the process proceeds to step S26. In step S26, the selection unit 42 selects the third mode. Further, the selection unit 42 selects data of which the total value T1 is the average value A1 or greater, out of the plurality of pieces of data received in step S10, as data to be compressed. In a case where step S26 ends, the process proceeds to step S28.

In step S28, as described above, the generation unit 44 generates a data group obtained by collecting the plurality of pieces of data received in step S10 into one file in accordance with the mode selected in step S20, step S24, or step S26. In step S30, the transmission unit 46 transmits the data group generated in step S28 to the tape drive 18. In a case where the processing of step S30 ends, the data recording processing ends.

As described above, according to the present embodiment, it is possible to efficiently record a data group obtained by collecting a plurality of pieces of data, on a magnetic tape.

In the above-described embodiment, the case where the selection unit 42 selects one mode of the first mode, the second mode, or the third mode by using the compression ratio of data and the time required for compression has been described, but the present disclosure is not limited thereto. For example, an aspect may be employed in which the selection unit 42 selects one mode of the first mode, the second mode, or the third mode by using the compression ratio of data, the time required for compression, and a time required for transmission of the data group obtained by collecting the plurality of pieces of data to the tape drive 18. In this case, an aspect is exemplified in which a score (hereinafter, referred to as "score C") for the time required for transmission is also predetermined for each of a plurality of ranges different from each other, as in the compression ratio and the time required for compression. Further, in this case, the selection unit 42 need only select one mode of the first mode, the second mode, or the third mode by comparing the total value T1 of the score A, the score B, and the score C with the threshold values TH1 and TH2, as in the above-described embodiment. Alternatively, the selection unit 42 may select one mode of the first mode, the second mode, or the third mode by using any one or a combination of two of the compression ratio of data, the time required for compression, and the time required for transmission of the data group obtained by collecting the plurality of pieces of data to the tape drive 18.

Alternatively, in the above-described embodiment, the selection unit 42 may select one mode of the first mode, the second mode, or the third mode according to the magnetic tape T of the recording destination of the data group in which the plurality of pieces of data are collected. In this case, for example, an aspect is exemplified in which the storage destination of data provided to the user (sometimes referred to as a bucket) is associated with the magnetic tape T, and the one mode of the first mode, the second mode, or the third mode is preset according to the characteristics of the data stored in the storage destination.

Alternatively, in the above-described embodiment, the selection unit 42 may select one mode of the first mode, the second mode, or the third mode according to a time slot in which processing of collecting the plurality of pieces of data into the data group is performed. In this case, whether the resource usage rate of the information processing device 12 is in any stage of three stages, that is, high, medium, or low, is predetermined for each time slot of a predetermined period, for example, from the history of the resource usage rate of the information processing device 12 in the past. Then, the selection unit 42 selects the second mode in a case where the time slot in which the processing of collecting the plurality of pieces of data into the data group is performed is the time slot of the "low" stage. Alternatively, the selection unit 42 selects the third mode in a case where the time slot in which the processing of collecting the plurality of pieces of data into the data group is performed is the time slot of the "medium" stage. Alternatively, the selection unit 42 selects the first mode in a case where the time slot in which the processing of collecting the plurality of pieces of data into the data group is performed is the time slot of the "high" stage. In the example of this aspect, it is possible to select a mode corresponding to the amount of required resources used, according to the resource status of the information processing device 12.

Alternatively, in the above-described embodiment, the selection unit 42 may select one mode of the first mode, the second mode, or the third mode according to the resource status of the information processing device 12 when processing of collecting the plurality of pieces of data into the data group is performed. In this case, the range of three stages, that is, high, medium, and low, is predetermined for the resource usage rate of the information processing device 12. Then, in a case where the resource usage rate of the information processing device 12 when the processing of collecting the plurality of pieces of data into the data group is performed is "low", the selection unit 42 selects the second mode. Alternatively, in a case where the resource usage rate of the information processing device 12 when the processing of collecting the plurality of pieces of data into the data group is performed is "medium", the selection unit 42 selects the third mode. Alternatively, in a case where the resource usage rate of the information processing device 12 when the processing of collecting the plurality of pieces of data into the data group is performed is "high", the selection unit 42 selects the first mode. In the example of this aspect, it is also possible to select a mode corresponding to the amount of required resources used according to the resource status of the information processing device 12.

Alternatively, in the above-described embodiment, the selection unit 42 may select one mode of the first mode, the second mode, or the third mode according to the maximum transmission rate of data to the tape drive 18 and the reception rate of the plurality of pieces of data, which are determined according to the standard of the connection interface between the information processing device 12 and the tape drive 18. Examples of the standard of the connection interface include Fiber Channel (FC), Serial Attached SCSI (SAS), and Serial Advanced Technology Attachment (SATA). In this case, the information processing device 12 measures the reception rate of the plurality of pieces of data transmitted from the user terminal. Then, the selection unit 42 selects the first mode, for example, in a case where the reception rate is less than the maximum transmission rate. Alternatively, the selection unit 42 selects the third mode in a case where the reception rate is the maximum transmission rate or more and the difference between the reception rate and the maximum transmission rate is less than a certain value. Alternatively, the selection unit 42 selects the second mode in a case where the reception rate is the maximum transmission rate or more and the difference between the reception rate and the maximum transmission rate is a certain value or more.

Further, in the above-described embodiment, the case where the score A and the score B are acquired by using the extension of each of the plurality of pieces of data has been described, but the present disclosure is not limited thereto. For the plurality of pieces of data, a data group may be actually generated in accordance with each mode of the first mode, the second mode, and the third mode, and the first mode, the second mode, and the third mode may be evaluated by using the actually measured values of the compression ratio and the time required for compression obtained in the generation processing. The score A and the score B can be used for this evaluation as in the above-described embodiment. In this case, the selection unit 42 selects one mode of the first mode, the second mode, or the third mode according to the evaluation result.

Alternatively, in the example of this aspect, the number of evaluation targets may be changed according to the resource status of the information processing device 12. In this case, for example, the higher the resource usage rate of the information processing device 12 is, the smaller the number of evaluation targets is.

Further, in the above-described embodiment, the selection unit 42 may select one mode of the first mode, the second mode, or the third mode according to the number of parallel processing in a case where the processing of collecting the plurality of pieces of data into the data group is performed in parallel. In this case, for example, the selection unit 42 selects the second mode in a case where the number of parallel processing is 1, selects the third mode in a case where the number of parallel processing is 2, and selects the first mode in a case where the number of parallel processing is 3.

Further, in the above-described embodiment, in a case where the selection unit 42 selects the second mode or the third mode, the selection unit 42 may select a compression algorithm used for data compression according to the magnetic tape of the recording destination of the data group, the time slot in which the processing of collecting the plurality of pieces of data into the data group is performed, or the resource status of the information processing device 12. Specifically, for example, the selection unit 42 selects a compression algorithm having a higher compression ratio as the resource usage rate of the information processing device 12 is lower.

Further, in the above-described embodiment, the user may be able to set which of the compression ratio and the time required for compression is prioritized. In this case, for example, the selection unit 42 performs weighting by using a weight coefficient having a value larger than a score having a lower priority with respect to a score having the higher priority, out of the score A and the score B.

Further, in the above-described embodiment, for example, the following various processors can be used as the hardware structure of a processing unit that executes various kinds of processing, such as the reception unit 40, the selection unit 42, the generation unit 44, and the transmission unit 46. The above-described various processors include, for example, a programmable logic device (PLD) which is a processor having a changeable circuit configuration after manufacture, such as a field programmable gate array (FPGA), and a dedicated electrical circuit which is a processor having a dedicated circuit configuration designed to perform specific processing, such as an application specific integrated circuit (ASIC), in addition to the CPU which is a general-purpose processor that executes software (programs) to function as various processing units, as described above.

One processing unit may be composed of one of these various processors or a combination of two or more processors of the same type or different types (for example, a combination of a plurality of FPGAs or a combination of a CPU and an FPGA). Alternatively, a plurality of processing units may be composed of one processor.

A first example in which a plurality of processing units are composed of one processor is an aspect in which one or more CPUs and software are combined to constitute one processor and the processor functions as the plurality of processing units, as typified by a computer, such as a client and a server. A second example is an aspect in which a processor that realizes all the functions of a system including the plurality of processing units with one integrated circuit (IC) chip is used, as typified by a system on chip (SoC). As described above, various processing units are formed of one or more of the above-described various processors as the hardware structure.

Further, as the hardware structure of these various processors, more specifically, an electric circuit (circuitry) in which circuit elements, such as semiconductor elements, are combined can be used.

Further, in the above-described embodiment, the aspect in which the information processing program 30 is stored (installed) in the storage unit 22 in advance has been described, but the present disclosure is not limited thereto. The information processing program 30 may be provided in a form of being recorded on a recording medium, such as a compact disc read only memory (CD-ROM), a digital versatile disc read only memory (DVD-ROM), and a Universal Serial Bus (USB) memory. Alternatively, the information processing program 30 may be downloaded from an external device via a network.

The disclosure of JP2020-044485 filed on Mar. 13, 2020 is incorporated herein by reference in its entirety. In addition, all documents, patent applications, and technical standards described in the present specification are incorporated herein by reference to the same extent as in a case of being specifically and individually noted that individual documents, patent applications, and technical standards are incorporated by reference.

What is claimed is:

1. An information processing device comprising:
at least one processor,
wherein the processor
selects, in a case where a plurality of pieces of data are collected and transmitted to a tape drive to be recorded on a magnetic tape, one mode of a first mode of transmitting a data group obtained by collecting the plurality of pieces of data without compression, to the tape drive, a second mode of transmitting a compressed data group in which the data group obtained by collecting the plurality of pieces of data is compressed, to the tape drive, or a third mode of transmitting a data group obtained by collecting a part of the plurality of pieces of data and remaining data, in which the part of the plurality of pieces of data is compressed and the remaining data is not compressed, to the tape drive, and
transmits a data group generated in accordance with the selected mode, to the tape drive.

2. The information processing device according to claim 1,
wherein the processor selects the one mode according to each of the plurality of pieces of data.

3. The information processing device according to claim 2,
wherein the processor selects the one mode by using at least one of a compression ratio of the data, a time required for compression, or a time required for transmission of the data group to the tape drive.

4. The information processing device according to claim 1,
wherein the processor selects the one mode according to the magnetic tape of a recording destination of the data group.

5. The information processing device according to claim 1,
wherein the processor selects the one mode according to a time slot in which processing of collecting the plurality of pieces of data into the data group is performed.

6. The information processing device according to claim 1,
wherein the processor selects the one mode according to a resource status of the information processing device.

7. The information processing device according to claim 1,
wherein the processor selects the one mode according to a maximum transmission rate of data to the tape drive and a reception rate of the plurality of pieces of data, which are determined according to a standard of a connection interface between the information processing device and the tape drive.

8. The information processing device according to claim 1,
wherein the processor evaluates at least one of the first mode, the second mode, or the third mode to select the one mode according to an evaluation result.

9. The information processing device according to claim 8,
wherein the processor changes the number of evaluation targets according to a resource status of the information processing device.

10. The information processing device according to claim 1,
wherein the processor selects the one mode according to the number of parallel processing in a case where processing of collecting the plurality of pieces of data into the data group is performed in parallel.

11. The information processing device according to claim 1,
wherein the processor selects a compression algorithm used for data compression according to the magnetic tape of a recording destination of the data group, a time slot in which processing of collecting the plurality of pieces of data into the data group is performed, or a resource status of the information processing device, in a case where the second mode or the third mode is selected.

12. The information processing device according to claim 2,
wherein the processor selects a compression algorithm used for data compression according to the magnetic tape of a recording destination of the data group, a time slot in which processing of collecting the plurality of pieces of data into the data group is performed, or a resource status of the information processing device, in a case where the second mode or the third mode is selected.

13. The information processing device according to claim 3,
wherein the processor selects a compression algorithm used for data compression according to the magnetic tape of a recording destination of the data group, a time slot in which processing of collecting the plurality of pieces of data into the data group is performed, or a resource status of the information processing device, in a case where the second mode or the third mode is selected.

14. The information processing device according to claim 4,
wherein the processor selects a compression algorithm used for data compression according to the magnetic tape of a recording destination of the data group, a time slot in which processing of collecting the plurality of pieces of data into the data group is performed, or a resource status of the information processing device, in a case where the second mode or the third mode is selected.

15. The information processing device according to claim 5,
wherein the processor selects a compression algorithm used for data compression according to the magnetic tape of a recording destination of the data group, a time slot in which processing of collecting the plurality of pieces of data into the data group is performed, or a resource status of the information processing device, in a case where the second mode or the third mode is selected.

16. The information processing device according to claim 6,
wherein the processor selects a compression algorithm used for data compression according to the magnetic tape of a recording destination of the data group, a time slot in which processing of collecting the plurality of pieces of data into the data group is performed, or a resource status of the information processing device, in a case where the second mode or the third mode is selected.

17. The information processing device according to claim 7,
wherein the processor selects a compression algorithm used for data compression according to the magnetic tape of a recording destination of the data group, a time slot in which processing of collecting the plurality of pieces of data into the data group is performed, or a resource status of the information processing device, in a case where the second mode or the third mode is selected.

18. The information processing device according to claim 8,
wherein the processor selects a compression algorithm used for data compression according to the magnetic tape of a recording destination of the data group, a time slot in which processing of collecting the plurality of pieces of data into the data group is performed, or a resource status of the information processing device, in a case where the second mode or the third mode is selected.

19. An information processing method executed by a processor provided in an information processing device, the method comprising:
selecting, in a case where a plurality of pieces of data are collected and transmitted to a tape drive to be recorded on a magnetic tape, one mode of a first mode of transmitting a data group obtained by collecting the plurality of pieces of data without compression, to the tape drive, a second mode of transmitting a compressed data group in which the data group obtained by collecting the plurality of pieces of data is compressed, to the tape drive, or a third mode of transmitting a data group obtained by collecting a part of the plurality of pieces of data and remaining data, in which the part of the plurality of pieces of data is compressed and the remaining data is not compressed, to the tape drive; and
transmitting a data group generated in accordance with the selected mode, to the tape drive.

20. A non-transitory computer-readable storage medium storing an information processing program for causing a processor provided in an information processing device to execute a process comprising:
selecting, in a case where a plurality of pieces of data are collected and transmitted to a tape drive to be recorded on a magnetic tape, one mode of a first mode of transmitting a data group obtained by collecting the plurality of pieces of data without compression, to the tape drive, a second mode of transmitting a compressed data group in which the data group obtained by collecting the plurality of pieces of data is compressed, to the tape drive, or a third mode of transmitting a data group obtained by collecting a part of the plurality of pieces of data and remaining data, in which the part of the plurality of pieces of data is compressed and the remaining data is not compressed, to the tape drive; and
transmitting a data group generated in accordance with the selected mode, to the tape drive.

\* \* \* \* \*